(12) United States Patent
Sheng et al.

(10) Patent No.: US 11,252,076 B2
(45) Date of Patent: Feb. 15, 2022

(54) DATA FORWARDING METHOD AND APPARATUS

(71) Applicant: Huawei Technologies Co., Ltd., Shenzhen (CN)

(72) Inventors: Zhenli Sheng, Shenzhen (CN); Rongfeng Huang, Shenzhen (CN); Fan Yu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 226 days.

(21) Appl. No.: 16/522,065

(22) Filed: Jul. 25, 2019

(65) Prior Publication Data
US 2019/0349288 A1    Nov. 14, 2019

Related U.S. Application Data

(63) Continuation of application No. PCT/CN2017/105905, filed on Oct. 12, 2017.

(30) Foreign Application Priority Data

Jan. 25, 2017    (CN) .......................... 201710056635.7

(51) Int. Cl.
*H04L 12/701*    (2013.01)
*H04L 12/721*    (2013.01)

(52) U.S. Cl.
CPC .......... *H04L 45/123* (2013.01); *H04L 45/124* (2013.01)

(58) Field of Classification Search
None
See application file for complete search history.

(56) References Cited

U.S. PATENT DOCUMENTS

2007/0086358 A1    4/2007    Thubert et al.
2014/0156826 A1*   6/2014    Chang .................... H04L 45/02
                                                              709/224

(Continued)

FOREIGN PATENT DOCUMENTS

CN    101374104 A    2/2009
CN    104270313 A    1/2015

(Continued)

OTHER PUBLICATIONS

Foreign Communication From a Counterpart Application, European Application No. 17893551.6, Extended European Search Report dated Nov. 14, 2019, 8 pages.

(Continued)

*Primary Examiner* — Scott M Sciacca
(74) *Attorney, Agent, or Firm* — Conley Rose, P.C.

(57) ABSTRACT

The method includes: forwarding, based on path sets of nodes in a network, service data between a source node and a sink node in the network, where the path sets of the nodes in the network are determined by iteratively performing the following path set determining step: for each link in the network, obtaining a path set of a start node of the link, and determining N shortest paths from an end node of the link to the sink node; and for each path included in the path set of the start node, determining, according to the N shortest paths, the path, and the link, to add a new path formed by the path and the link into a path set of the end node.

20 Claims, 3 Drawing Sheets

---

For each link in the network, obtain a path set of a start node of the link, and determine N shortest paths from an end node of the link to a sink node in the network, where N is a natural number not less than 1    — 2011

↓

For each path included in the path set of the start node, determine, according to the N shortest paths, the path, and the link, to add a new path formed by the path and the link into a path set of the end node    — 2012

(56) References Cited

U.S. PATENT DOCUMENTS

| | | | |
|---|---|---|---|
| 2015/0256442 A1* | 9/2015 | Hu | G06Q 10/04 370/254 |
| 2016/0261495 A1* | 9/2016 | Xia | H04L 45/12 |
| 2017/0317780 A1 | 11/2017 | Wood et al. | |

FOREIGN PATENT DOCUMENTS

| | | |
|---|---|---|
| CN | 104980351 A | 10/2015 |
| CN | 105049353 A | 11/2015 |
| CN | 105515714 A | 4/2016 |
| CN | 105743794 A | 7/2016 |
| CN | 105897575 A | 8/2016 |
| EP | 3041169 A1 | 7/2016 |
| WO | 2015027246 A1 | 2/2015 |

OTHER PUBLICATIONS

Machine Translation and Abstract of Chinese Publication No. CN104270313, dated Jan. 7, 2015, 12 pages.
Machine Translation and Abstract of Chinese Publication No. CN105049353, dated Nov. 11, 2015, 50 pages.
Machine Translation and Abstract of Chinese Publication No. CN105515714, dated Apr. 20, 2016, 14 pages.
Machine Translation and Abstract of Chinese Publication No. CN105897575, dated Aug. 24, 2016, 9 pages.
Widyono, R., et al., "The Design and Evaluation of Routing Algorithms for Real-time Channels," International Computer Science Institute Berkeley, Jun. 1994, 37 pages.
Foreign Communication From a Counterpart Application, PCT Application No. PCT/CN2017/105905, English Translation of International Search Report dated Nov. 27, 2017, 2 pages.
Foreign Communication From a Counterpart Application, PCT Application No. PCT/CN2017/105905, English Translation of Written Opinion dated Nov. 27, 2017, 4 pages.
Machine Translation and Abstract of Chinese Publication No. CN101374104, dated Feb. 25, 2009, 15 pages.
Machine Translation and Abstract of Chinese Publication No. CN104980351, dated Oct. 14, 2015, 12 pages.
Foreign Communication From a Counterpart Application, Chinese Application No. 201710056635.7, Chinese Office Action dated Jan. 7, 2020, 5 pages.

* cited by examiner

DATA FORWARDING METHOD AND APPARATUS

CROSS-REFERENCE TO RELATED APPLICATIONS

This application is a continuation of International Application No. PCT/CN2017/105905, filed on Oct. 12, 2017, which claims priority to Chinese Patent Application No. 201710056635.7, field on Jan. 25, 2017, The disclosures of the aforementioned applications are hereby incorporated by reference in their entireties.

TECHNICAL FIELD

Embodiments of the present invention relate to the field of communications technologies, and in particular, to a data forwarding method and apparatus.

BACKGROUND

With development of communications technologies, software-defined networking SDN) has gained increasing attention as a new network architecture. A core idea of the SDN is separating a control plane of a network from a forwarding plane of the network, and an SDN controller on the control plane may perform centralized control on data forwarding in a network on the forwarding plane, so as to flexibly deploy network traffic. When controlling forwarding of data in a network, the SDN controller may first determine path sets of nodes in the network, and then forward, based on the path sets of the nodes in the network, service data between a source node and a sink node in the network. A path set of a node includes a path from the source node to the node. The source node is a node that serves as an information source for sending service data, and the sink node is a node that serves as an information sink for receiving the service data.

Currently, a path set determining step may be iteratively performed to determine path sets of nodes in a network, and the path set determining step includes: for each link in the network, determining a path set of a start node of the link; and for each path included in the path set of the start node, when a new path formed by the path and the link meets a quality of service (Quality of Service, QoS) constraint condition, adding the new path formed by the path and the link into a path set of an end node of the link. The QoS constraint condition is a condition that can ensure that the new path formed by the path and the link meets a quality of service requirement on a service.

When the new path formed by the path and the link meets the QoS constraint condition, the new path formed by the path and the link is added into the path set of the end node of the link. Therefore, the path set of the end node includes a relatively large quantity of paths, resulting in occupancy of a large quantity of memories. In addition, path sets of some nodes need to be determined based on the path set of the end node. Therefore, when the path set of the end node includes a relatively large quantity of paths, a relatively large calculation amount and a relatively long calculation time are required for determining the path sets of these nodes based on the path set of the end node.

SUMMARY

To resolve a related technical problem, embodiments of the present invention provide a data forwarding method and apparatus. The technical solutions are as follows:

According to a first aspect, a data forwarding method is provided, and the method includes: forwarding, based on path sets of nodes in a network, service data between a source node and a sink node in the network, where the path set of the node includes a path from the source node to the node, and the path sets of the nodes in the network are determined by iteratively performing the following path set determining step: for each link in the network, obtaining a path set of a start node of the link, and determining N shortest paths from an end node of the link to the sink node, where the N shortest paths are determined one by one based on N link attributes, and N is a natural number not less than 1; and for each path included in the path set of the start node, determining, according to the N shortest paths, the path, and the link, to add a new path formed by the path and the link into a path set of the end node.

It should be noted that the N shortest paths are determined one by one based on N link attributes. To be specific, the N shortest paths are in one-to-one correspondence with the N link attributes, and each of the N shortest paths is determined based on a corresponding link attribute.

In the embodiments of the present invention, the new path formed by the path and the link is determined, according to the N shortest paths, the path, and the link, to be added into the path set of the end node, thereby ensuring that at least one of paths extending from the added new path backward to the sink node can meet a service requirement, excluding some invalid paths that extend from the added new path backward to the sink node and that cannot meet the service requirement. This reduces a quantity of paths included in the path set of the end node, reduces memory occupancy, and further reduces a subsequent calculation amount of determining, based on the path set of the end node, a path set of another node and shortens a calculation time.

The determining, according to the N shortest paths, the path, and the link, to add a new path formed by the path and the link into a path set of the end node includes: determining, according to N attribute values corresponding to the N shortest paths, N attribute values of the path, and N attribute values of the link, to add the new path formed by the path and the link into the path set of the end node.

It should be noted that for each of the N shortest paths, an attribute value corresponding to the shortest path is an attribute value that indicates a link attribute corresponding to the shortest path.

The determining, according to N attribute values corresponding to the N shortest paths, N attribute values of the path, and N attribute values of the link, to add the new path formed by the path and the link into the path set of the end node includes: for each link attribute, calculating a first attribute value of the path, a second attribute value of the link, and a third attribute value of a shortest path corresponding to the link attribute, and calculating a sum of the first attribute value, the second attribute value, and the third attribute value; and when the sum of the first attribute value, the second attribute value, and the third attribute value that is calculated for each link attribute is not greater than a threshold of the link attribute, determining to add the new path formed by the path and the link into the path set of the end node.

In the embodiments of the present invention, when the sum of the first attribute value, the second attribute value, and the third attribute value that is calculated for each link attribute is not greater than the threshold of the link attribute, it may be determined that at least one of paths extending from the new path formed by the path and the link backward to the sink node can meet the service requirement. Therefore, the new path formed by the path and the link may be determined to be added into the path set of the end node of the link.

The determining, according to N attribute values corresponding to the N shortest paths, N attribute values of the path, and N attribute values of the link, to add the new path formed by the path and the link into the path set of the end node includes: for each link attribute, calculating a first attribute value of the path, a second attribute value of the link, and a third attribute value of a shortest path corresponding to the link attribute, and calculating a sum of the first attribute value, the second attribute value, and the third attribute value; and when the sum of the first attribute value, the second attribute value, and the third attribute value that is calculated for each link attribute is not greater than a threshold of the link attribute and there is no designated path in the path set of the end node, determining to add the new path formed by the path and the link into the path set of the end node, where N attribute values of the designated path are less than N attribute values of the new path formed by the path and the link, respectively.

The designated path requires fewer integrated resources than the new path formed by the path and the link, that is, the designated path is superior to the new path formed by the path and the link. Therefore, when there is no designated path in the path set of the end node, it indicates that no path superior to the new path formed by the path and the link exists in the path set of the end node. In this case, the new path formed by the path and the link may be determined to be added into the path set of the end node.

The iteratively performing the path set determining step includes: iteratively performing the path set determining step until no path set that does not converge exists in the path sets of the nodes in the network or until a quantity of iterations is equal to a value obtained by subtracting 1 from a quantity of nodes in the network, where the path set that does not converge is a path set that is obtained after a current iteration and that includes paths not exactly the same as paths included by a path set obtained after a previous iteration.

It should be noted that the N link attributes include at least one of a cost, a delay, a delay variation, or a packet loss rate. In addition, the N link attributes are attributes with additivity, and the additivity means that an attribute value of a path is equal to a sum of attribute values of all links included in the path.

According to a second aspect, a data forwarding apparatus is provided, and the data forwarding apparatus has a function of implementing operations in the data forwarding method according to the first aspect. The data forwarding apparatus includes at least one module, and the at least one module is configured to implement the data forwarding method provided in the first aspect.

According to a third aspect, a data forwarding apparatus is provided, a structure of the data forwarding apparatus includes a processor and a memory. The memory is configured to: store a program that supports the data forwarding apparatus in performing the data forwarding method provided in the first aspect, and store related data used for implementing the data forwarding method provided in the first aspect. The processor is configured to execute the program stored in the memory. The data forwarding apparatus may further include a communications bus, and the communications bus is configured to establish a connection between the processor and the memory.

Technical effects obtained according to the second aspect and the third aspect are similar to those obtained by using a corresponding technical means in the first aspect. Details are not described herein again.

According to a fourth aspect, a computer readable storage medium is provided, the computer readable storage medium stores an instruction, and when the instruction is run on a computer, the computer is caused to perform the data forwarding method according to the first aspect.

According to a fifth aspect, a computer program product that includes an instruction is provided, and when the instruction is run on a computer, the computer is caused to perform the data forwarding method according to the first aspect.

Beneficial effects brought by the technical solutions provided in the embodiments of the present invention are as follows: After the path sets of the nodes in the network are obtained by iteratively performing the path set determining step, the service data between the source node and the sink node in the network may be forwarded based on the path sets of the nodes in the network. In the path set determining step, for each link in the network, the N shortest paths from the end node of the link to the sink node are first determined, and then the new path formed by the path and the link is determined, according to the N shortest paths, the path, and the link, to be added into the path set of the end node, thereby ensuring that at least one of paths extending from the added new path backward to the sink node can meet a service requirement, excluding some invalid paths that extend from the added new path backward to the sink node and that cannot meet the service requirement. This reduces a quantity of paths included in the path set of the end node, reduces memory occupancy, and further reduces a subsequent calculation amount of determining, based on the path set of the end node, a path set of another node and shortens a calculation time.

DESCRIPTION OF EMBODIMENTS

Figure 1A:
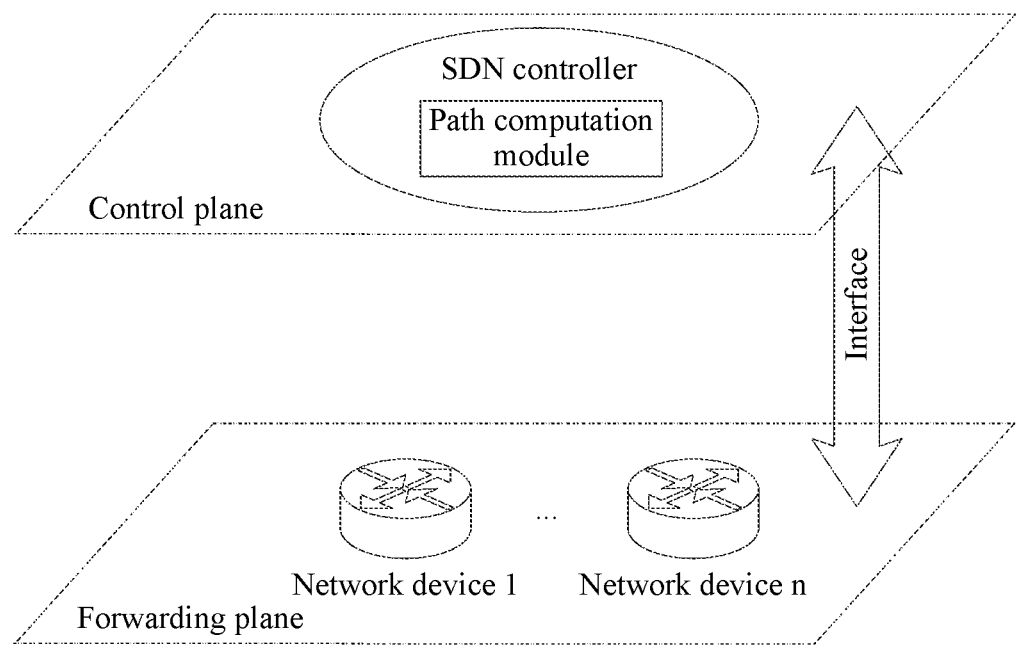
FIG. 1A is a schematic diagram of SDN according to an embodiment of the present invention.

Before the embodiments of the present invention are described in detail, the following first describes application scenarios of the embodiments of the present invention. FIG. 1A is a schematic diagram of SDN according to an embodiment of the present invention. Referring to FIG. 1A, the SDN has three basic features compared with a conventional network. First, a control plane is separated from a forwarding plane, where the forwarding plane is a controlled network device, and a forwarding manner and service logic are controlled by an SDN controller on the control plane.

Second, an open interface is disposed between the control plane and the forwarding plane, where the SDN provides an open programmable interface for the control plane; in this case, the SDN controller needs to be concerned with only logic of the SDN controller, without needing to be concerned with implementation details of a bottom layer. Third, centralized control on logic is implemented, where the SDN controller may control a plurality of network devices, and therefore, a global network topology can be obtained, and optimization control on a network can be implemented according to the network topology.

A most basic function of the SDN control plane is a service path computation function, and the service path computation function may be implemented by using a path computation module in the SDN controller. After the path computation module determines a service path, the SDN controller may deliver the service path to a network device, so that the network device can forward service data according to the service path after receiving the service data. It should be noted that, in this embodiment of the present invention, a node is a network device.

In the related art, the path computation module may determine a service path by using a constrained Bellman-Ford (Constrained Bellman-Ford, CBF) algorithm. Specifically, the CBF algorithm may include the following steps (1) to (5):

(1) Initialize a path set PATH of each node in a network to 0, and let k=1, where k is a quantity of iterations.

(2) For each link (u, v) in the network, when a new path p+(u, v) formed by (u, v) and a path p that is included in a path set PATH(u) of a start node u of (u, v) meets a QoS constraint condition, add the new path p+(u, v) into a path set PATH(v) of an end node v of (u, v).

(3) Determine whether a path set that does not converge exists in the path sets of the nodes in the network, or determine whether k is equal to a value obtained by subtracting 1 from a quantity of the nodes in the network, where the path set that does not converge is a path set that is obtained after a current iteration and that includes paths not exactly the same as paths included by a path set obtained after a previous iteration.

(4) When a path set that does not converge exists in the path sets of the nodes in the network or k is not equal to the value obtained by subtracting 1 from the quantity of the nodes in the network, let k=k+1, and return to step (2), until no path set that does not converge exists in the path sets of the nodes in the network or until k is equal to the value obtained by subtracting 1 from the quantity of the nodes in the network.

(5) When no path set that does not converge exists in the path sets of the nodes in the network or k is equal to the value obtained by subtracting 1 from the quantity of the nodes in the network, obtain a path set of a sink node in the network, and select an optimum path from the path set of the sink node as the service path.

It should be noted that the foregoing step (2) may be performed by a path selection maintenance unit in the path computation module, and the foregoing step (5) may be performed by an optimum-service-path output unit in the path computation module.

It should be noted that a path set determining step in the data forwarding method provided in this embodiment of the present invention may be applied to the foregoing CBF algorithm to improve the CBF algorithm. Specifically, the foregoing step (2), that is, the path set determining operation of the foregoing path selection maintenance unit, may be improved, and an improved CBF algorithm may be renamed as a CBF* algorithm. Certainly, in an actual application, the path set determining step in the data forwarding method provided in this embodiment of the present invention may also be applied to another algorithm or a service scenario with a path set determining requirement. This is not limited in this embodiment of the present invention.

Figure 1B:
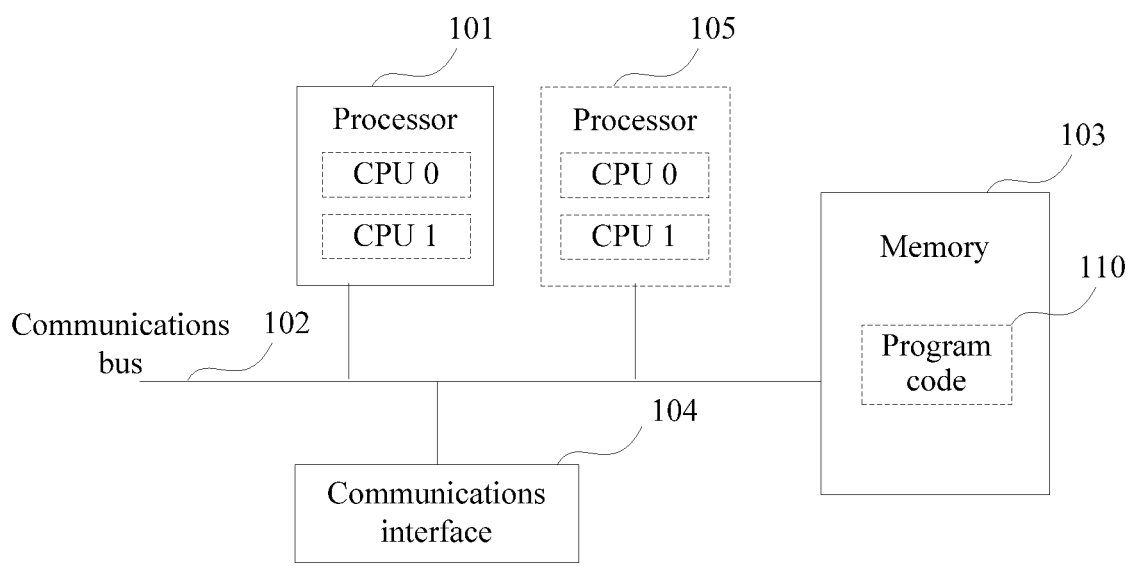
FIG. 1B is a schematic structural diagram of an SDN controller according to an embodiment of the present invention.

FIG. 1B is a schematic structural diagram of an SDN controller according to an embodiment of the present invention. The SDN controller may be the SDN controller shown in FIG. 1A. Referring to FIG. 1B, the SDN controller includes at least one processor 101, a communications bus 102, a memory 103, and at least one communications interface 104.

The processor 101 may be a general purpose central processing unit (central processing unit, CPU), a microprocessor, an application-specific integrated circuit (application-specific integrated circuit, ASIC), or one or more integrated circuits for controlling execution of a program in a solution of the present invention.

The communications bus 102 may include a channel for transferring information between the foregoing components.

The memory 103 may be a read-only memory (read-only memory, ROM) or another type of static storage device that may store static information and instructions, a random access memory (random access memory, RAM) or another type of dynamic storage device that may store information and instructions, an electrically erasable programmable read-only memory (Electrically Erasable Programmable Read-Only Memory, EEPROM), a compact disc read-only memory (Compact Disc Read-Only Memory, CD-ROM) or another optical disk storage, an optical disc storage (including a compact disc, a laser disc, an optical disc, a digital versatile disc, a Blu-ray disc, or the like), a magnetic disc storage medium or another magnetic storage device, or any other medium that can be used to carry or store expected program code in an instruction or data structure form and that can be accessed by the SDN controller, without being limited thereto though. The memory 103 may exist alone, and is connected to the processor 101 by using the communications bus 102. The memory 103 may alternatively be integrated with the processor 101.

The communications interface 104 uses an apparatus such as a transceiver to communicate with another device or communications network such as Ethernet, a radio access network (radio access network, RAN), or a wireless local area network (Wireless Local Area Networks, WLAN).

During specific implementation, in an embodiment, the processor 101 may include one or more CPUs, for example, a CPU 0 and a CPU 1 shown in FIG. 1B.

During specific implementation, in an embodiment, the SDN controller may include a plurality of processors, for example, a processor 101 and a processor 105 shown in FIG. 1B. Each of these processors may be a single-core processor (single-CPU), or may be a multi-core processor (multi-CPU). The processor herein may be one or more devices, circuits, and/or processing cores for processing data.

The memory 103 is configured to store program code 110 used for executing the solution of the present invention, and the processor 101 is configured to execute the program code 110 stored in the memory 103. The SDN controller may implement, by using the processor 101 and the program code 110 in the memory 103, a data forwarding method provided in an embodiment of FIG. 2A in the following.

Figure 2A:
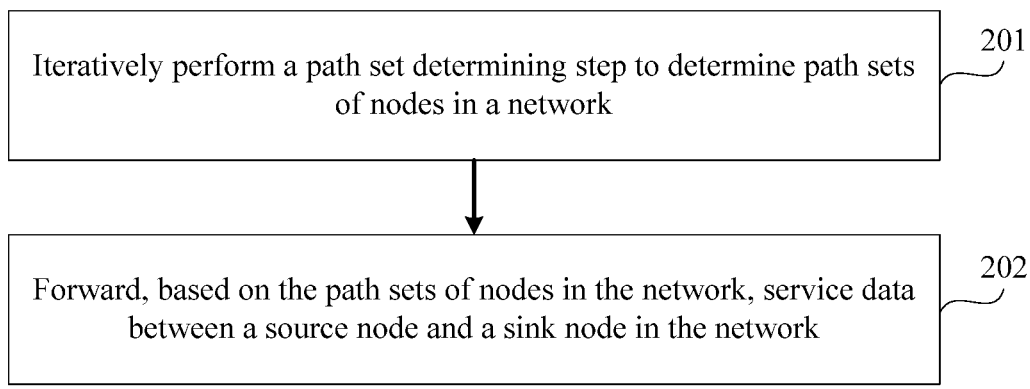
FIG. 2A is a flowchart of a data forwarding method according to an embodiment of the present invention.

FIG. 2A is flowchart of a data forwarding method according to an embodiment of the present invention, and the method is applied to an SDN controller. Referring to FIG. 2A, the method includes the following steps.

Step 201: Iteratively perform a path set determining step to determine path sets of nodes in a network.

Specifically, the path set determining step may be iteratively performed until no path set that does not converge exists in the path sets of the nodes in the network or until a quantity of iterations is equal to a value obtained by subtracting 1 from a quantity of nodes in the network, where the path set that does not converge is a path set that is obtained after a current iteration and that includes paths not exactly the same as paths included by a path set obtained after a previous iteration.

It should be noted that, for each node in the network, a path set of the node includes a path from a source node in the network to the node.

In addition, the path may include at least one link, and a link is a line that is used by two nodes to perform direct communication, that is, the link does not pass through another node.

Moreover, when no path set that does not converge exists in the path sets of the nodes in the network or until the quantity of iterations is equal to the value obtained by subtracting 1 from the quantity of nodes in the network, a path set, obtained after a current iteration, of a node in the network is regarded as a to-be-determined path set of the node in the network.

Figure 2B:
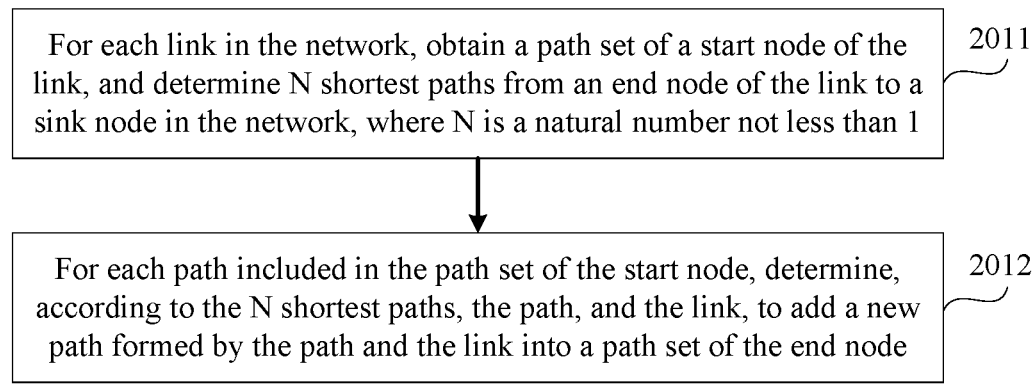
FIG. 2B is a flowchart of a path set determining step according to an embodiment of the present invention.

Referring to FIG. 2B, the path set determining step may include the following steps 2011 and 2012.

Step 2011: For each link in the network, obtain a path set of a start node of the link, and determine N shortest paths from an end node of the link to a sink node in the network, where N is a natural number not less than 1.

It should be noted that the N shortest paths are determined one by one based on N link attributes. To be specific, the N shortest paths are in one-to-one correspondence with the N link attributes, and each of the N shortest paths is determined based on a corresponding link attribute.

In addition, the N link attributes are attributes with additivity, and the additivity is that an attribute value of a path is equal to a sum of attribute values of all links included in the path, where an attribute value is a value indicating a link attribute. For example, the N link attributes may include a cost (cost), a delay (delay), a delay variation, a packet loss rate, or the like, and the cost may be a link length, current load, or the like.

Moreover, for each of the N link attributes, in all paths from the end node of the link to the sink node in the network, a shortest path corresponding to the link attribute indicates a minimum attribute value of the link attribute.

The operation of determining N shortest paths from an end node of the link to a sink node in the network may be: obtaining the N shortest paths from the end node to the sink node from N shortest paths from each node to the sink node in the network.

Further, the N shortest paths from each node to the sink node in the network may also be determined before obtaining the N shortest paths from the end node to the sink node from the N shortest paths from each node to the sink node in the network. Specifically, a network topology of the network and N attribute values of each link in the network may be obtained, where each of the N attribute values indicates a link attribute; and the N shortest paths from each node to the sink node in the network are determined based on the network topology of the network and the N attribute values of each link in the network.

It should be noted the operation of determining the N shortest paths from each node to the sink node in the network based on the network topology of the network and the N attribute values of each link in the network may be performed by a shortest-path-tree computation element in a path computation module in the SDN controller.

During determining, based on the network topology of the network and the N attribute values of each link in the network, the N shortest paths from each node to the sink node in the network, for each of the N link attributes, based on the network topology, a shortest path from each node to the sink node in the network is determined according to a shortest path algorithm by using an attribute value, indicating the link attribute, of each link in the network as a weight of the link, and the determined shortest path is corresponding to the link attribute.

For example, the N link attributes include a cost and a delay, based on the network topology, a shortest path from each node to the sink node in the network may be determined according to a shortest path algorithm by using a cost value of each link in the network as a weight of the link; and a shortest path from each node to the sink node in the network may be determined according to a shortest path algorithm by using a delay value of each link in the network as a weight of the link.

It should be noted that the shortest path algorithm may be preset. For example, the shortest path algorithm may be a Dijkstra (Dijkstra) algorithm, a Bellman-Ford (Bellman-Ford) algorithm, or the like.

In addition, for details about the operation of determining, based on the network topology, a shortest path from each node to the sink node in the network according to a shortest path algorithm by using an attribute value, indicating the link attribute, of each link in the network as a weight of the link, refer to the related art. Details are not described in this embodiment of the present invention.

Step 2012: For each path included in the path set of the start node, determine, according to the N shortest paths, the path, and the link, to add a new path formed by the path and the link into a path set of the end node.

For each path included in the path set of the start node, it may be determined, according to the N shortest paths, the path, and the link, whether the new path formed by the path and the link needs to be added into the path set of the end node. When it is determined that the new path formed by the path and the link needs to be added into the path set of the end node, the operation of adding a new path formed by the path and the link into a path set of the end node is performed.

It should be noted that, in the related art, the new path formed by the path and the link is added into the path set of the end node provided that the new path formed by the path and the link meets a QoS constraint condition. However, in an actual application, even if the new path formed by the path and the link can meet the QoS constraint condition, a path extending from the new path backward to the sink node cannot necessarily meet the QoS constraint condition. In this case, the path set of the end node includes many invalid paths. As a result, the path set of the end node includes a relatively large quantity of paths, resulting in greatly increasing storage and calculation complexity.

However, in this embodiment of the present invention, the N shortest paths from the end node to the sink node are first determined, and then the new path formed by the path and the link is determined, according to the N shortest paths, the path, and the link, to be added into the path set of the end node, thereby ensuring that at least one of paths extending from the added new path backward to the sink node can meet a service requirement, excluding some invalid paths that extend from the added new path backward to the sink node and that cannot meet the service requirement. This reduces a quantity of paths included in the path set of the end node, reduces memory occupancy, and further reduces a subsequent calculation amount of determining, based on the path set of the end node, a path set of another node and shortens a calculation time.

Specifically, the new path formed by the path and the link may be determined, according to N attribute values corresponding to the N shortest paths, N attribute values of the path, and N attribute values of the link, to be added into the path set of the end node.

It should be noted that for each of the N shortest paths, an attribute value corresponding to the shortest path is an attribute value that indicates a link attribute corresponding to the shortest path.

The operation of determining, according to N attribute values corresponding to the N shortest paths, N attribute values of the path, and N attribute values of the link, to add the new path formed by the path and the link into the path set of the end node may be implemented in the following first or second manner.

In the first manner, for each link attribute, a first attribute value of the path, a second attribute value of the link, and a third attribute value of a shortest path corresponding to the link attribute are calculated, and a sum of the first attribute value, the second attribute value, and the third attribute value is calculated; and when the sum of the first attribute value, the second attribute value, and the third attribute value that is calculated for each link attribute is not greater than a threshold of the link attribute, the new path formed by the path and the link is determined to be added into the path set of the end node.

It should be noted that, for each of the N link attributes, the first attribute value, the second attribute value, and the third attribute value that are calculated for the link attribute all indicate the link attribute, and the third attribute value calculated for the link attribute is a required minimum value of the link attribute of a shortest path from the end node to the sink node.

For example, the N link attributes include a cost and a delay, a first attribute value calculated for a cost attribute is a cost value of the path, a second attribute value is a cost value of the link, and a third attribute value is a cost value of a shortest path, corresponding to the cost attribute, in the N shortest paths. A first attribute value calculated for a delay attribute is a delay value of the path, a second attribute value is a delay value of the link, and a third attribute value is a delay value of a shortest path, corresponding to the delay attribute, in the N shortest paths.

An operation of determining whether the sum of the first attribute value, the second attribute value, and the third attribute value that is calculated for each link attribute is not greater than the threshold of the link attribute may include the following steps A to D.

Step A: Determine whether a sum of a first attribute value, a second attribute value, and a third attribute value that is calculated for an $i^{th}$ link attribute in the N link attributes is not greater than a threshold of the $i^{th}$ link attribute, where i is not less than 1 and not greater than N.

It should be noted that the threshold of the $i^{th}$ link attribute may be preset, and in an actual application, the threshold of the $i^{th}$ link attribute may be set according to a QoS constraint of a service. This is not limited in this embodiment of the present invention.

In addition, when any path is selected from the path set of the sink node subsequently as a service path, the N link attributes each may be used as a constraint attribute. To be specific, a path may be used as a service path, provided that each of N attribute values of the path is not greater than a threshold of a link attribute corresponding to the attribute value of the path. In this case, thresholds of the N link attributes may be set to fixed values.

When an optimum path in the path set of the sink node is used as the service path subsequently, there is a target attribute in the N link attributes, and a link attribute other than the target attribute may be used as a constraint attribute. To be specific, when each constraint attribute value of a path meets a threshold of a constraint attribute corresponding to the constraint attribute value of the path, and a target attribute value of the path is a minimum target attribute value in the path set of the sink node, the path may be used as the service path, where a constraint attribute value indicates a constraint attribute, and a target attribute value indicates a target attribute. In this case, all thresholds of link attributes in the N link attributes other than the target attribute may be set to fixed values, while a threshold of the target attribute may be continuously updated based on a path set of a current sink node. Specifically, the path set of the current sink node may be obtained. When the path set of the current sink node is empty, the threshold of the target attribute is set to an infinite value (∞) or is a relatively large preset value; or when the path set of the current sink node is not empty, a target attribute value of each path included in the path set of the current sink node is obtained, and a minimum target attribute value in the obtained target attribute values is determined as the threshold of the target attribute.

It should be noted that when the sum of the first attribute value, the second attribute value, and the third attribute value that is calculated for the $i^{th}$ link attribute is not greater than the threshold of the $i^{th}$ link attribute, the following step B to step D may continue to be performed to determine whether the sum of the first attribute value, the second attribute value, and the third attribute value that is calculated for each link attribute is not greater than the threshold of the link attribute. When the sum of the first attribute value, the second attribute value, and the third attribute value that is calculated for the $i^{th}$ link attribute is greater than the threshold of the $i^{th}$ link attribute, it may be directly determined that a sum of a first attribute value, a second attribute value, and a third attribute value that is calculated for a link attribute in the N link attributes is greater than a threshold of the link attribute.

Step B: When the sum of the first attribute value, the second attribute value, and the third attribute value that is calculated for the $i^{th}$ link attribute is not greater than the threshold of the $i^{th}$ link attribute, determine whether i is equal to N.

It should be noted that when i is not equal to N, the following step C may continue to be performed to determine whether the sum of the first attribute value, the second attribute value, and the third attribute value that is calculated for each link attribute is not greater than the threshold of the link attribute; or when i is equal to N, the following step E may continue to be performed to determine whether the sum of the first attribute value, the second attribute value, and the third attribute value that is calculated for each link attribute is not greater than the threshold of the link attribute.

Step C: When i is not equal to N, let i=i+1, and return to step A until i is equal to N.

When i is not equal to N, it indicates that a sum of a first attribute value, a second attribute value, and a third attribute value that is calculated for each of i link attributes in the N link attributes is not greater than a threshold of the link attribute. Therefore, in this case, it is required to allow i=i+1 and return to step A, to continue to determine whether a sum of a first attribute value, a second attribute value, and a third attribute value that is calculated for an $(i+1)^{th}$ link attribute in the N link attributes is not greater than a threshold of the $(i+1)^{th}$ link attribute.

Step D: When i is equal to N, determine that the sum of the first attribute value, the second attribute value, and the third attribute value that is calculated for each link attribute is not greater than the threshold of the link attribute.

In the second manner, for each link attribute, a first attribute value of the path, a second attribute value of the link, and a third attribute value of a shortest path corresponding to the link attribute are calculated, and a sum of the first attribute value, the second attribute value, and the third attribute value is calculated; and when the sum of the first attribute value, the second attribute value, and the third attribute value that is calculated for each link attribute is not greater than a threshold of the link attribute and there is no designated path in the path set of the end node, the new path formed by the path and the link is determined to be added into the path set of the end node.

It should be noted that N attribute values of the designated path are less than N attribute values of the new path formed by the path and the link, respectively. To be specific, for each of the N link attributes, an attribute value, indicating the link attribute, of the designated path is less than an attribute value, indicating the link attribute, of the new path formed by the path and the link.

The designated path requires fewer integrated resources than the new path formed by the path and the link, that is, the designated path is superior to the new path formed by the path and the link. Therefore, when there is no designated path in the path set of the end node, it indicates that no path superior to the new path formed by the path and the link exists in the path set of the end node. In this case, the new path formed by the path and the link may be determined to be added into the path set of the end node.

Further, the operation, in the foregoing second manner, of determining, when the sum of the first attribute value, the second attribute value, and the third attribute value that is calculated for each link attribute is not greater than a threshold of the link attribute and there is no designated path in the path set of the end node, to add the new path formed by the path and the link into the path set of the end node is described with reference to a specific example. The link is (u, v), a start node of the link is a node u, and an end node of the link is a node v. The N link attributes are a cost and a delay, the N shortest paths are a shortest path z1 and a shortest path z2, where the shortest path z1 is corresponding to a cost attribute, the shortest path z2 is corresponding to a delay attribute. To be specific, a cost value of the shortest path z1 is a minimum cost required for passing through from the node v to the sink node, and a delay value of the shortest path z2 is a shortest delay required for passing through from the node v to the sink node. The path is a path p in a path set PATH(u) of the node u.

In this case, when the sum of the first attribute value, the second attribute value, and the third attribute value that is calculated for each link attribute is not greater than the threshold of the link attribute and there is no designated path in the path set of the end node, the new path formed by the path and the link is determined to be added into the path set of the end node. To be specific, when cost(p)+cost(u, v)+cost(z1)≤C, delay(p)+delay(u, v)+delay(z2)≤D, and p+(u, v) is not dominated over by a path included in PATH (v), the new path p+(u, v) formed by the path p and the link (u, v) is determined to be added into the path set PATH(v) of the node v.

It should be noted that cost(p) is a cost value of the path p, cost(u, v) is a cost value of the link (u, v), cost(z1) is the cost value of the shortest path z1, and C is a threshold of the cost attribute. delay(p) is a delay value of the path p, delay(u, v) is a delay value of the link (u, v), delay(z2) is the delay value of the shortest path z2, and D is a threshold of the delay attribute.

In addition, that p+(u, v) is not dominated over by PATH(v) means that: No path q PATH(v) makes cost(q)<cost(p+(u, v)) and delay(q)<delay(p+(u, v)) both hold. cost(q) is a cost value of the path q, cost(p+(u, v)) is a cost value of the path p+(u, v), delay(q) is a delay value of the path q, and delay(p+(u, v)) is a delay value of the path p+(u, v).

Moreover, the foregoing describes a dominance concept by using only an example in which the N link attributes are a cost and a delay. In an actual application, the foregoing dominance concept may also be conveniently applied to a case in which the N link attributes are other attributes. For example, when the N link attributes are a delay, a cost, and a delay variation (delay jitter), that p+(u, v) is not dominated over by PATH(v) means that: No path q □ PATH(v) makes cost(q)<cost(p+(u, v)), delay(q)<delay(p+(u, v)), and delay jitter(q)<delay jitter(p+(u, v) all hold. delay jitter(q) is a delay variation value of the path q, and delay jitter (p+(u, v) is a delay variation value of the path (p+(u, v).

Step 202: Forward, based on the path sets of the nodes in the network, service data between a source node and a sink node in the network.

Specifically, the path set of the sink node may be obtained from the path sets of the nodes in the network, a service path is determined from paths included in the path set of the sink node, and the service path is delivered to a node in the network, so that the node in the network may forward, according to the service path, the service data between the source node and the sink node.

In addition, for the operation of forwarding, based on the path sets of the nodes in the network, service data between a source node and a sink node in the network, refer to the related art. Details are not described in this embodiment of the present invention.

In this embodiment of the present invention, after the path sets of the nodes in the network are obtained by iteratively performing the path set determining step, the service data between the source node and the sink node in the network may be forwarded based on the path sets of the nodes in the network. In the path set determining step, for each link in the network, the N shortest paths from the end node of the link to the sink node are first determined, and then the new path formed by the path and the link is determined, according to the N shortest paths, the path, and the link, to be added into the path set of the end node, thereby ensuring that at least one of paths extending from the added new path backward to the sink node can meet a service requirement, excluding some invalid paths that extend from the added new path backward to the sink node and that cannot meet the service requirement. This reduces a quantity of paths included in the path set of the end node, reduces memory occupancy, and further reduces a subsequent calculation amount of determining, based on the path set of the end node, a path set of another node and shortens a calculation time.

Figure 3A:
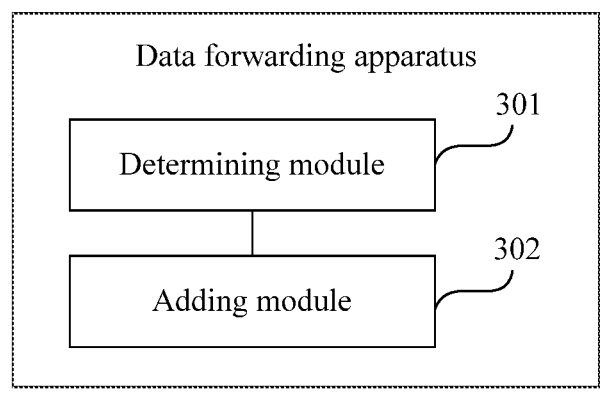
FIG. 3A is a schematic structural diagram of a data forwarding apparatus according to an embodiment of the present invention.

FIG. 3A is a schematic structural diagram of a data forwarding apparatus according to an embodiment of the present invention. The data forwarding apparatus may be implemented by software, hardware, or a combination thereof and implemented as a part of an SDN controller or a whole SDN controller, and the SDN controller may be the SDN controller shown in FIG. 1B. The apparatus forwards, based on path sets of nodes in a network, service data between a source node and a sink node in the network, and the path set of the node includes a path from the source node to the node. Referring to FIG. 3A, the apparatus iteratively triggers the following determining module 301 and adding module 302 to determine the path sets of the nodes in the network.

The determining module 301 is configured to perform step 2011 in the embodiment of FIG. 2A.

The adding module 302 is configured to perform step 2012 in the embodiment of FIG. 2A.

Figure 3B:
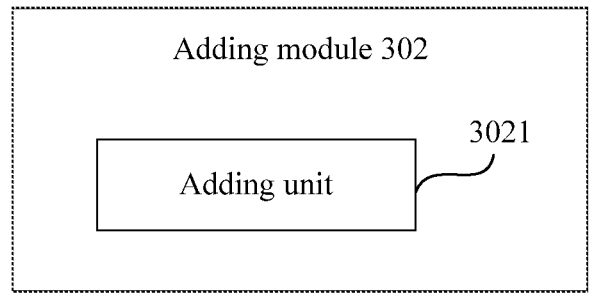
FIG. 3B is a schematic structural diagram of an adding module according to an embodiment of the present invention.

Optionally, referring to FIG. 3B, the adding module 302 includes an adding unit 3021.

The adding unit 3021 is configured to determine, according to N attribute values corresponding to N shortest paths, N attribute values of a path, and N attribute values of a link, to add a new path formed by the path and the link into a path set of an end node.

Optionally, the adding unit 3021 is configured to perform the first manner or second manner in step 2012 in the embodiment of FIG. 2A.

Optionally, the apparatus is further configured to: iteratively trigger the determining module 301 and the adding module 302 until no path set that does not converge exists in the path sets of the nodes in the network or until a quantity of iterations is equal to a value obtained by subtracting 1 from a quantity of nodes in the network, where the path set that does not converge is a path set that is obtained after a current iteration and that includes paths not exactly the same as paths included by a path set obtained after a previous iteration.

Optionally, the N link attributes include at least one of a cost, a delay, a delay variation, or a packet loss rate.

In this embodiment of the present invention, after the path sets of the nodes in the network are obtained by iteratively performing the path set determining step, the service data between the source node and the sink node in the network may be forwarded based on the path sets of the nodes in the network. In the path set determining step, for each link in the network, the N shortest paths from the end node of the link to the sink node are first determined, and then the new path formed by the path and the link is determined, according to the N shortest paths, the path, and the link, to be added into the path set of the end node, thereby ensuring that at least one of paths extending from the added new path backward to the sink node can meet a service requirement, excluding some invalid paths that extend from the added new path backward to the sink node and that cannot meet the service requirement. This reduces a quantity of paths included in the path set of the end node, reduces memory occupancy, and further reduces a subsequent calculation amount of determining, based on the path set of the end node, a path set of another node and shortens a calculation time.

It should be noted that when the data forwarding apparatus provided in the foregoing embodiment forwards data, only division of the foregoing function modules is used as an example for description. In an actual application, the foregoing functions may be allocated to and implemented by different function modules according to a requirement. To be specific an internal structure of the apparatus is divided into different function modules to implement all or some of the functions described above. In addition, the data forwarding apparatus and the data forwarding method provided in the foregoing embodiments belong to a same concept. For a specific implementation process, refer to the foregoing method embodiment, and details are not described herein again.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedure or functions according to the embodiments of the present invention are all or partially generated. The computer may be a general purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a digital versatile disc (Digital Versatile Disc, DVD), a semiconductor medium (for example, a solid-state drive (Solid State Disk, SSD)), or the like.

The foregoing descriptions are merely example embodiments of this application, but are not intended to limit this application. Any modification, equivalent replacement, or improvement made without departing from the spirit and principle of this application should fall within the protection scope of this application.

What is claimed is:

1. A data forwarding method performed by a controller, comprising:
   for each link in a network;
      iteratively obtaining a path set of a start node of a link; and
      determining N shortest paths from an end node of the link to a sink node in the network based on N link attributes, wherein N is a natural number being greater than one; and
   determining, for each path comprised in the path set of the start node, to add a new path formed by a respective path in the path set of the start node and a link into a path set of the end node according to the N shortest paths, the respective path, and the link into the path set of the end node; and
   forwarding service data between a source node and the sink node based on path sets of nodes in the network, wherein each of the path sets of the nodes comprise a path from the source node to the sink node.

2. The data forwarding method of claim 1, further comprising determining to add the new path into the path set of the end node according to N attribute values corresponding to the N shortest paths, N attribute values of the respective path, and N attribute values of the link into the path set of the end node.

3. The data forwarding method of claim 2, further comprising:
- calculating, for each link attribute, a first attribute value of the path, a second attribute value of the link, and a third attribute value of a shortest path corresponding to the link attribute;
- calculating a sum of the first attribute value, the second attribute value, and the third attribute value; and
- determining to add the new path into the path set of the end node in response to the sum of the first attribute value, the second attribute value, and the third attribute value calculated for each link attribute being less than a threshold of the link attribute.

4. The data forwarding method of claim 3, further comprising updating a threshold of a target attribute in the N link attributes based on a path set of the sink node, wherein a path with a target attribute value being a smallest in the path set of the sink node is a service path, wherein the target attribute value indicates the target attribute, and wherein the service path is a forwarding path for the service data between the source node and the sink node.

5. The data forwarding method of claim 2, further comprising:
- calculating, for each link attribute, a first attribute value of the path, a second attribute value of the link, and a third attribute value of a shortest path corresponding to the link attribute;
- calculating a sum of the first attribute value, the second attribute value, and the third attribute value; and
- determining to add the new path into the path set of the end node in response to the sum of the first attribute value, the second attribute value, and the third attribute value that is calculated for each link attribute being less than a threshold of the link attribute, wherein there is no designated path in the path set of the end node, and wherein N attribute values of the designated path are less than N attribute values of the new path formed by the path and the link, respectively.

6. The data forwarding method of claim 1, further comprising iteratively obtaining the path set of the start node either until every path in the path sets of the nodes in the network converge or until a quantity of iterations is equal to a value obtained by subtracting one from a quantity of nodes in the network, and wherein the path set that does not converge is obtained after a current iteration, and is different than a path set from a previous iteration.

7. The data forwarding method of claim 1, wherein the N link attributes comprise at least one of a cost, a delay, a delay variation, or a packet loss rate.

8. A data forwarding apparatus, comprising:
- a processor; and
- a memory, coupled to the processor and storing one or more programs that, when executed by the processor, cause the data forwarding apparatus to be configured to:
  - for each link in a network:
    - obtain a path set of a start node of a link; and
    - determine N shortest paths from an end node of the link to a sink node in the network based on N link attributes, and wherein N is a natural number being greater than one; and
  - determine, for each path comprised in the path set of the start node, to add a new path formed by a respective path in the path set of the start node and a link into a path set of the end node according to the N shortest paths, the respective path, and the link into the path set of the end node.

9. The data forwarding apparatus of claim 8, wherein the programs further cause the processor to be configured to add the new path into the path set of the end node according to N attribute values corresponding to the N shortest paths, N attribute values of the respective path, and N attribute values of the link into the path set of the end node.

10. The data forwarding apparatus of claim 9, wherein the programs further cause the processor to be configured to:
- calculate, for each link attribute, a first attribute value of the path, a second attribute value of the link, and a third attribute value of a shortest path corresponding to the link attribute;
- calculate a sum of the first attribute value, the second attribute value, and the third attribute value; and
- determine to add the new path into the path set of the end node in response to the sum of the first attribute value, the second attribute value, and the third attribute value that is calculated for each link attribute being less than a threshold of the link attribute.

11. The data forwarding apparatus of claim 10, wherein the programs further cause the processor to be configured to update a threshold of a target attribute in the N link attributes, wherein the N link attributes are based on a path set of the sink node, wherein a service path is a path with a target attribute value is smallest in the path set of the sink node, wherein the target attribute value is used to indicate the target attribute, and wherein the service path is a forwarding path for a service data between a source node and the sink node.

12. The data forwarding apparatus of claim 9, wherein the programs further cause the processor to be configured to:
- calculate, for each link attribute, a first attribute value of the path, a second attribute value of the link, and a third attribute value of a shortest path corresponding to the link attribute;
- calculate a sum of the first attribute value, the second attribute value, and the third attribute value; and
- determine to add the new path into the path set of the end node in response to the sum of the first attribute value, the second attribute value, and the third attribute value that is calculated for each link attribute less than a threshold of the link attribute, wherein there is no designated path in the path set of the end node, and wherein N attribute values of the designated path are less than N attribute values of the new path formed by the path and the link, respectively.

13. The data forwarding apparatus of claim 8, wherein the programs further cause the processor to be configured to iteratively determine whether to add the new path into the path set of the end node until either every path in the path sets of the nodes in a network converge or a quantity of iterations is equal to a value obtained by subtracting one from a quantity of nodes in the network, and wherein the path set that does not converge is obtained after a current iteration and is different from a path set from a previous iteration.

14. The data forwarding apparatus of claim 8, wherein the N link attributes comprise at least one of a cost, a delay, a delay variation, or a packet loss rate.

15. A computer program product comprising computer-executable instructions stored on a non-transitory computer-readable medium that, in response are executed by a processor, cause an apparatus to:
- forward service data between a source node and a sink node in a network based on path sets of nodes in the network, wherein the path sets of the nodes comprises a path from the source node to the sink node;

for each link in the network:
  iteratively obtain a path set of a start node of a link;
  determine N shortest paths from an end node of the link to the sink node based on N link attributes, wherein N is a natural number being greater than one; and
  determine, for each path comprised in the path set of the start node, to add a new path formed by a respective path in the path set of the start node and a link into a path set of the end node according to the N shortest paths, the respective path, and the link into the path set of the end node.

16. The computer program product of claim 15, wherein the computer-executable instructions further cause the apparatus to add the new path into the path set of the end node according to N attribute values corresponding to the N shortest paths, N attribute values of the respective path, and N attribute values of the link into the path set of the end node.

17. The computer program product of claim 16, wherein the computer-executable instructions further cause the apparatus to:
  calculate, for each link attribute, a first attribute value of the path, a second attribute value of the link, and a third attribute value of a shortest path corresponding to the link attribute;
  calculate a sum of the first attribute value, the second attribute value, and the third attribute value; and
  determine to add the new path into the path set of the end node in response to the sum of the first attribute value, the second attribute value, and the third attribute value calculated for each link attribute being less than a threshold of the link attribute.

18. The computer program product of claim 16, wherein the computer-executable instructions further cause the apparatus to:
  calculate, for each link attribute, a first attribute value of the path, a second attribute value of the link, and a third attribute value of a shortest path corresponding to the link attribute;
  calculate a sum of the first attribute value, the second attribute value, and the third attribute value; and
  determine to add the new path into the path set of the end node in response to the sum of the first attribute value, the second attribute value, and the third attribute value that is calculated for each link attribute being less than a threshold of the link attribute, wherein there is no designated path in the path set of the end node, and wherein N attribute values of the designated path are less than N attribute values of the new path formed by the path and the link, respectively.

19. The computer program product of claim 16, wherein the computer-executable instructions further cause the apparatus to update a threshold of a target attribute in the N link attributes based on a path set of the sink node, wherein a path with a target attribute value is smallest in the path set of the sink node is a service path, the target attribute value is used to indicate the target attribute, and the service path is a forwarding path for the service data between the source node and the sink node.

20. The computer program product of claim 15, wherein the computer-executable instructions further cause the apparatus to iteratively obtain the path set of the start node either until every path in the path sets of the nodes in the network converge or until a quantity of iterations is equal to a value obtained by subtracting one from a quantity of nodes in the network, and wherein the path set that does not converge is obtained after a current iteration, and is different than a path set from a previous iteration.

* * * * *